United States Patent
Lee et al.

(10) Patent No.: US 9,728,804 B2
(45) Date of Patent: Aug. 8, 2017

(54) FLEXIBLE SECONDARY BATTERY

(71) Applicant: Samsung Electronics Co., Ltd., Suwan-si, Gyeonggi-do (KR)

(72) Inventors: Yeonil Lee, Seoul (KR); Moonseok Kwon, Hwaseong-si (KR); Euncheol Do, Seoul (KR); Jaeman Choi, Hwaseong-si (KR)

(73) Assignee: SAMSUNG ELECTRONICS CO., LTD, Gyeonggi-Do (KR)

( * ) Notice: Subject to any disclaimer, the term of this patent is extended or adjusted under 35 U.S.C. 154(b) by 287 days.

(21) Appl. No.: 14/538,009

(22) Filed: Nov. 11, 2014

(65) Prior Publication Data
US 2015/0132631 A1    May 14, 2015

(30) Foreign Application Priority Data
Nov. 11, 2013  (KR) .................. 10-2013-0136542

(51) Int. Cl.
*H01M 10/04*     (2006.01)
*H01M 10/052*    (2010.01)
*H01M 10/058*    (2010.01)

(52) U.S. Cl.
CPC ... *H01M 10/0436* (2013.01); *H01M 10/0468* (2013.01); *H01M 10/0472* (2013.01); *H01M 10/052* (2013.01); *H01M 10/058* (2013.01); *H01M 2220/30* (2013.01)

(58) Field of Classification Search
None
See application file for complete search history.

(56) References Cited

U.S. PATENT DOCUMENTS

| | | | |
|---|---|---|---|
| 3,375,136 A * | 3/1968 | Biggar | H01M 2/021 205/160 |
| 4,020,244 A | 4/1977 | Selinko | |
| 7,939,218 B2 | 5/2011 | Niu | |
| 2007/0087266 A1 | 4/2007 | Bourke et al. | |
| 2008/0102354 A1 * | 5/2008 | Lee | H01M 10/0431 429/94 |
| 2008/0187838 A1 | 8/2008 | Le | |
| 2010/0233529 A1 * | 9/2010 | Nansaka | H01M 2/021 429/181 |
| 2011/0183169 A1 | 7/2011 | Bhardwaj et al. | |
| 2012/0121963 A1 | 5/2012 | Kwon et al. | |
| 2013/0040201 A1 | 2/2013 | Manthiram et al. | |
| 2013/0083496 A1 | 4/2013 | Franklin et al. | |
| 2013/0108906 A1 | 5/2013 | Bhardwaj et al. | |

(Continued)

FOREIGN PATENT DOCUMENTS

JP    2007123255 B2    5/2007
KR    1020080086614 A    9/2008
(Continued)

*Primary Examiner* — Patrick Ryan
*Assistant Examiner* — Carmen Lyles-Irving
(74) *Attorney, Agent, or Firm* — Cantor Colburn LLP

(57) ABSTRACT

A flexible secondary battery includes: an electrode stack structure including a first electrode layer, a second electrode layer, and a separator disposed between the first and second electrode layers; and a binding structure surrounding the electrode stack structure, where the binder structure is in fixed contact with a first side of the electrode stack structure and is in slidable contact with a second side of the electrode stack structure.

12 Claims, 13 Drawing Sheets

(56) References Cited

U.S. PATENT DOCUMENTS

| | | | |
|---|---|---|---|
| 2013/0108907 A1 | 5/2013 | Bhardwaj et al. | |
| 2014/0079979 A1* | 3/2014 | Kwon | H01M 2/08 |
| | | | 429/127 |
| 2014/0131630 A1 | 5/2014 | Hwang et al. | |
| 2014/0170467 A1 | 6/2014 | Kwon et al. | |
| 2015/0207168 A1* | 7/2015 | Do | H01M 10/04 |
| | | | 429/127 |

FOREIGN PATENT DOCUMENTS

| | | |
|---|---|---|
| WO | 2011023530 A1 | 3/2011 |
| WO | 2012009145 A2 | 1/2012 |

* cited by examiner

FLEXIBLE SECONDARY BATTERY

CROSS-REFERENCE TO RELATED APPLICATION

This application claims priority to Korean Patent Application No. 10-2013-0136542, filed on Nov. 11, 2013, and all the benefits accruing therefrom under 35 U.S.C. §119, the content of which in its entirety is herein incorporated by reference.

BACKGROUND

1. Field

The disclosure relates to a secondary battery, and more particularly, to a flexible secondary battery.

2. Description of the Related Art

With the development of electronics, not only markets for cellular phones, portable multimedia players ("PMP"s), and MPEG audio layer-3 ("MP3") players, but also markets for other various portable electronic devices such as smartphones, smart pads, electronic book readers, flexible tablet computers, and portable medical devices attachable to the human body have grown.

The growth of markets for such portable electronic devices has increased demand for batteries suitable for operating such portable electronic devices. In addition, such portable electronic devices are increasingly required to be flexible in view of durability during transportation, storage, and impact, and thus the demand for flexible batteries has also increased.

If batteries having insufficient flexibility are bent, for example, stress may be concentrated on an internal interface of an electrode active material layer, an interface between an electrode active material layer and an inter-electrode separator, or an interface between an electrode active material layer and a collector, and thus stripping may occur at such interfaces, to affect the safety, performance and lifespans of the batteries.

If batteries of the related art are twisted or bent, the performance of the batteries may be lowered, or undesired reactions may occur in the batteries. Therefore, such batteries may not be effectively used for the flexible electronic device. Sheet-type batteries having small thicknesses for improving flexibility have been introduced. However, such sheet-type batteries typically have low energy capacity and thus have limited applications.

SUMMARY

Provided are flexible secondary batteries variously deformable by twisting or bending and capable of maintaining stability even when being deformed.

According to an embodiment of the invention, a flexible secondary battery includes: an electrode stack structure including a first electrode layer, a second electrode layer, and a separator formed between the first and second electrode layers; and a binding structure surrounding the electrode stack structure, the binder structure is in fixed contact with a first side of the electrode stack structure and is in slidable contact with a second side of the electrode stack structure.

In an embodiment, the electrode stack structure may further include a protection layer disposed on at least one of the first and second sides of the electrode stack structure.

In an embodiment, the flexible secondary battery may further include a stiff film disposed on the first side of the electrode stack structure.

In an embodiment, the flexible secondary battery may further include another binding structure disposed on the second side of the electrode stack structure.

In an embodiment, the binding structure may be disposed on each of both lateral portions of the stiff film.

In an embodiment, the flexible secondary battery may further include another stiff film disposed on the other side of the electrode stack structure, where the binding structure may surround the stiff films.

In an embodiment, the binding structure may be disposed in a stacking direction of the electrode stack structure.

In an embodiment, the binding structure may be provided in plurality, and the plurality of binding structures may be arranged in a direction different from a stacking direction of the electrode stack structure.

In an embodiment, the binding structure may have a constant width.

In an embodiment, the binding structure may include: a fixed contact portion in fixed contact with the first side of the electrode stack structure; and a slidable contact portion in slidable contact with the second side of the electrode stack structure.

In an embodiment, the fixed contact portion and the slidable contact portion may have different widths from each other.

In an embodiment, the electrode stack structure may have a single stack type structure, a roll type structure, or a multi-folding type structure.

BRIEF DESCRIPTION OF THE DRAWINGS

These and/or other features will become more apparent by describing embodiments thereof in further detail with reference to the accompanying drawings, in which.

DETAILED DESCRIPTION

Figure 1A:
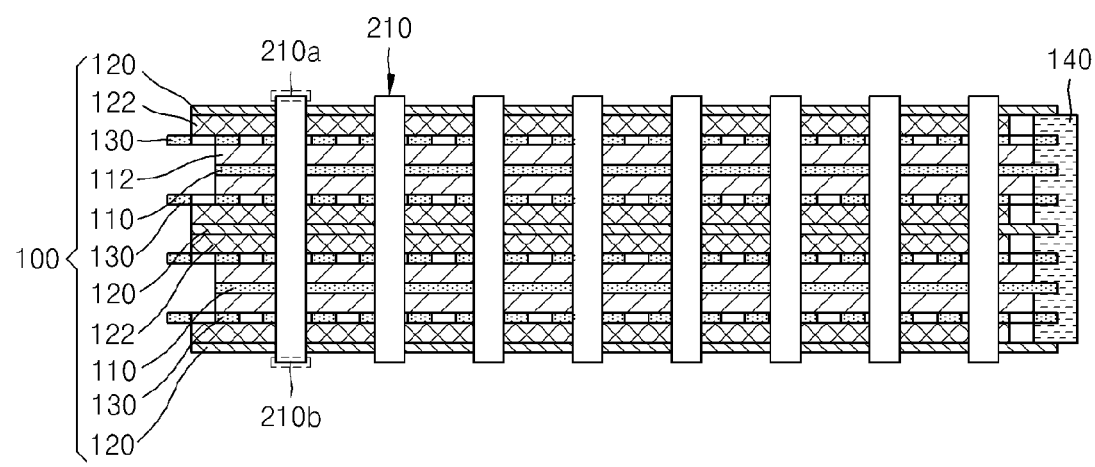
FIGS. 1A to 1C are side views illustrating embodiments of a flexible secondary battery according to the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of a flexible secondary battery will be described in detail with reference to the accompanying drawings.

Figure 1B:
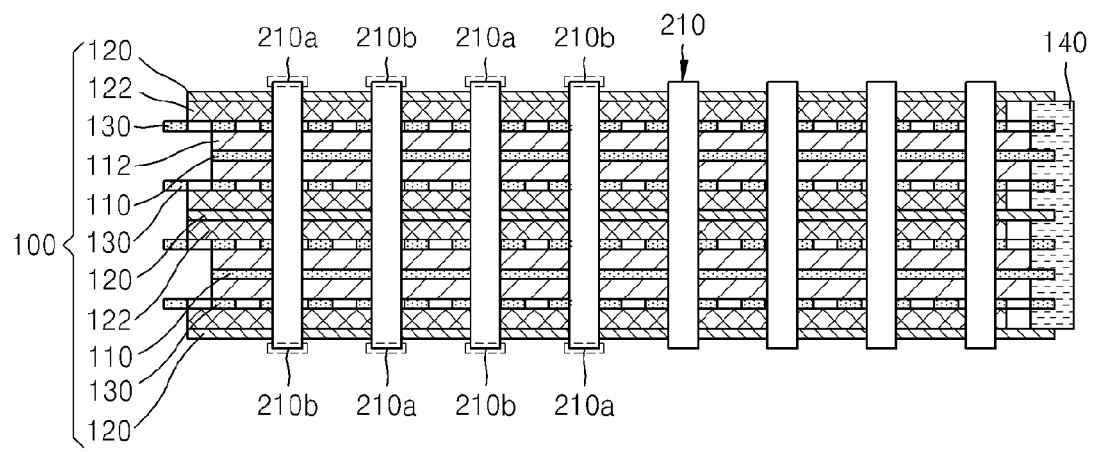
Figure 1C:
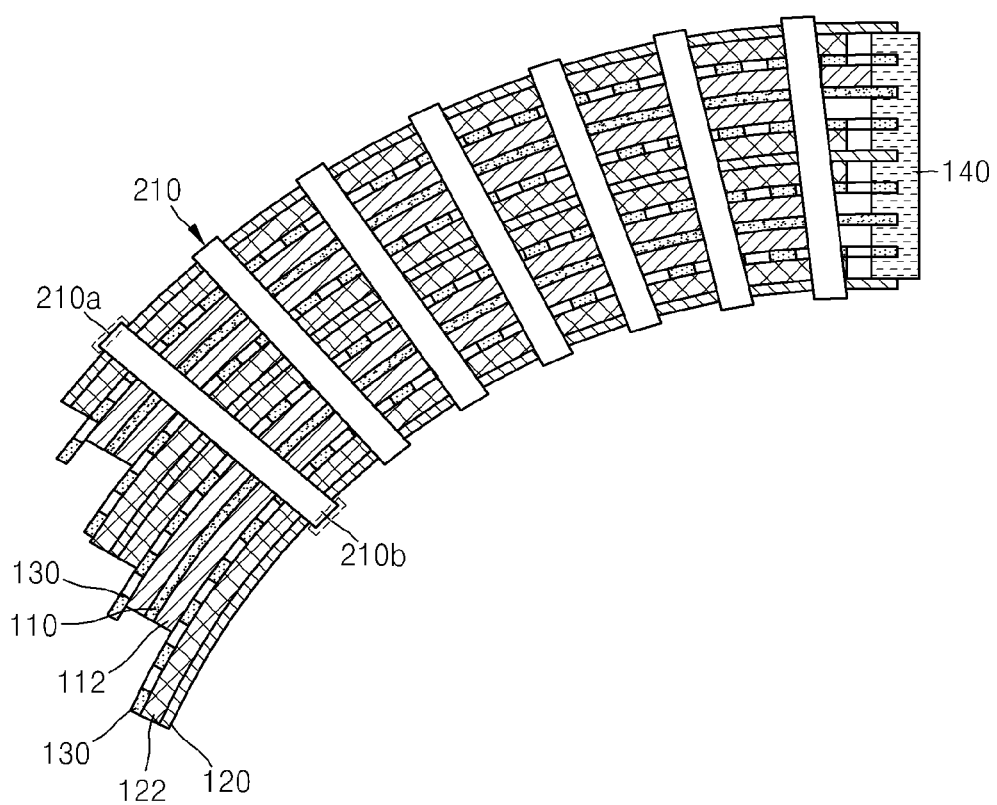

FIGS. 1A to 1C are side views illustrating embodiments of a flexible secondary battery according to the invention.

Referring to FIGS. 1A and 1B, an embodiment of the flexible secondary battery according to the invention may include first electrode layers (110, 112), second electrode layers (120, 122), and separators 130 disposed between the first electrode layers (110, 112) and the second electrode layers (120, 122). The first electrode layers (110, 112) and the second electrode layers (120, 122) may be alternately arranged with the separators 130 therebetween. In an embodiment, a single electrode stack unit may be defined by a first electrode layer (110, 112), a separator 130 disposed on the first electrode layer (110, 112) a second electrode layer (120, 122) disposed on the separator 130. An electrode stack structure 100 may be defined or formed by a plurality of such electrode stack units including separators 130 therebetween. In an exemplary embodiment, the flexible secondary battery may further include a fixing part 140 disposed on an end of the electrode stack structure 100 for fixing the electrode stack structure 100. In an alternative embodiment, the fixing part 140 may be omitted.

The electrode stack structure 100 may include a binding structure, e.g., one or more binding structures 210, surrounding the electrode stack structure 100. The binding structures 210 may have a band or belt shape and may surround the electrode stack structure 100. In an embodiment, the binding structures 210 may be wound around the electrode stack structure 100 in a stacking direction, in which layers of the electrode stack structure 100 are stacked, or in a direction perpendicular to the stacking direction of the layers of the electrode stack structure 100. Alternatively, the binding structures 210 may be wound in a direction between the stacking direction of the layers of the electrode stack structure 100 and a direction perpendicular to the stacking direction.

Referring to FIGS. 1A and 1B, in an embodiment, the binding structures 210 are wound around the electrode stack structure 100 in the stacking direction of the layers of the electrode stack structure 100. As described above, one or more binding structures 210 may surround the electrode stack structure 100. In an embodiment, as shown in FIG. 1A, eight binding structures 210 may be wound around the electrode stack structure 100 in the stacking direction of the layers of the electrode stack structure 100. However, the embodiments of the invention are not limited thereto. In such an embodiment, the number of the binding structures 210 is not limited but may be appropriately selected. The binding structures 210 may support the electrode stack structure 100 so that the electrode stack structure 100 may maintain a shape thereof. In an embodiment, a plurality of binding structure, e.g., two or more binding structures 210, may be wound around the electrode stack structure 100. In such an embodiment, where two or more binding structures 210 are used, the distance between the binding structures 210 is not limited but may be appropriately selected. In one embodiment, for example, the binding structures 210 may be arranged at regular intervals or irregular intervals. The binding structures 210 may have constant widths. However, the binding structures 210 are not limited thereto. In on embodiment, for example, the widths of the binding structure 210 may be varied according to positions.

The binding structures 210 may be attached to the electrode stack structure 100 in a predetermined manner to allow the binding structures 210 to be fixed to a side of the electrode stack structure 100. In an embodiment of the flexible secondary battery according to the invention, the binding structures 210 may be in fixed contact or make fixed contact with a side (e.g., a first side) of the electrode stack structure 100 and may be in slidable contact or make slidable contact with another side (e.g., a second side) of the electrode stack structure 100. The binding structures 210 may be attached to the electrode stack structure 100 in such a manner such that the binding structures 210 are fixed to at least one side of the electrode stack structure 100. Regions of the binding structures 210 making fixed contact with a side of the electrode stack structure 100 may be referred to as fixed contact portions 210b, and other regions of the binding structures 210 making non-fixed contact with another side of the electrode stack structure 100 may be referred to as slidable contact portions 210a. In an embodiment, as shown in FIG. 1A, all the fixed contact portions 210b of the binding structures 210 are on a side of the electrode stack structure 100, and all the slidable contact portions 210a of the binding structures 210 are on another side (e.g., opposing side) of the electrode stack structure 100. In an alternative embodiment, as shown in FIG. 1B, the fixed contact portions 210b and the slidable contact portions 210a of the binding structures 210 are alternately arranged on a side and another side of the electrode stack structure 100. In such an embodiment, when the electrode stack structure 100 is repeatedly bent, the arrangement structure of the electrode stack structure 100 may be effectively maintained to allow reversible electrochemical reaction by the one or more binding structures 210.

FIG. 1C is a side view illustrating an embodiment of the flexible secondary battery in a bent state, according to the invention. Referring to FIG. 1C, in such an embodiment, the fixing part 140 is provided on an end of the electrode stack structure 100. When the electrode stack structure 100 is bent, sliding may occur on the other end of the electrode stack structure 100 on which the fixing part 140 is not provided. As shown in FIG. 1C, when the electrode stack structure 100 is bent in one direction, the fixed contact portions 210b of the binding structures 210 fixed to the electrode stack structure 100 may not be moved relative to the electrode stack structure 100, but the slidable contact portions 210a of the binding structures 210 may be moved relative to the electrode stack structure 100.

Hereinafter, each layer of the electrode stack structure 100 of embodiments of the flexible secondary battery described with reference to FIGS. 1A to 1C will be described in greater detail.

In an embodiment, the first electrode layers (110, 112) may be positive electrode films or negative electrode films. In an embodiment, where the first electrode layers (110, 112) are positive electrode films, the second electrode layers (120, 122) may be negative electrode films. In an embodiment, where the first electrode layers (110, 112) are negative electrode films, the second electrode layers (120, 122) may be positive electrode films. Each of the first electrode layers (110, 112) may include a first metal collector 110 and a first active material layer 112 disposed on the first metal collector 110. Each of the second electrode layers (120, 122) may include a second metal collector 120 and a second active material layer 122 disposed on the second metal collector 120. In an embodiment, where the first electrode layers (110, 112) are positive electrode films, the first metal collectors 110 may be positive electrode collectors, and the first active material layers 112 may be positive electrode active material layers. In an embodiment where the second electrode layers (120, 122) are negative electrode films, the second metal collector s120 may be negative electrode collectors, and the second active material layers 122 may be negative electrode active material layers.

The positive electrode collectors may include aluminum, stainless steel, titanium, copper, silver, or a combination thereof. The positive electrode active material layers may include a positive electrode active material, a binder, and a conducting agent.

The positive electrode active material may be a material that allows reversible intercalation and discharge of lithium ions. In one embodiment, for example, the positive electrode active material include: lithium transition metal oxides such as lithium cobalt oxide, lithium nickel oxide, lithium nickel cobalt oxide, lithium nickel cobalt aluminum oxide, lithium nickel cobalt manganese oxide, lithium manganese oxide and lithium iron phosphate; nickel sulfides; copper sulfides; sulfur; iron oxides; vanadium oxides; or a combination thereof.

The binder may include: polyvinylidene fluoride-containing binders such as polyvinylidene fluoride, vinylidene fluoride/hexafluoropropylene copolymer, vinylidene fluoride/tetrafluoroethylene copolymer; carboxymethyl cellulose-containing binders such as sodium-carboxymethyl cellulose and lithium-carboxymethyl cellulose; acrylate-containing binders such as polyacrylic acid, lithium-polyacrylic acid, acrylic, polyacrylonitrile, polymethyl methacrylate, and polybutylacrylate; polyamide-imides; polytetrafluoroethylene; polyethylene oxide; polypyrrole; lithium-Nafion; styrene butadiene rubber-containing polymers; or a combination thereof.

The conducting agent may include: carbon-containing conducting agents such as carbon black, carbon fiber, and graphite; conductive fiber such as metal fiber; metal powder such as carbon fluoride powder, aluminum powder and nickel powder; conductive whisker such as zinc oxides and potassium titanate; conductive metal oxides such as titanium oxides; conductive polymers such as polyphenylene derivatives; or a combination thereof.

The negative electrode collectors may include copper, stainless steel, nickel, aluminum, titanium or a combination thereof. The negative electrode active material layers may include a negative electrode active material, a binder and a conducting agent.

The negative electrode active material layers may include be formed of a material capable of forming an alloy together with lithium or allowing reversible intercalation and discharge of lithium. In one embodiment, for example, the negative electrode active material may be include metals, carbon-containing materials, metal oxides, lithium metal nitrides or a combination thereof. The metals may include lithium, silicon, magnesium, calcium, aluminum, germanium, tin, lead, arsenic, antimony, bismuth, silver, gold, zinc, cadmium, mercury, copper, iron, nickel, cobalt, indium or a combination thereof. The carbon-containing materials may include graphite, graphite carbon fiber, coke, mesocarbon microbeads ("MCMB"s), polyacene, pitch-derived carbon fiber, hard carbon or a combination thereof. The metal oxides may include lithium titanium oxides, titanium oxides, molybdenum oxides, niobium oxides, iron oxides, tungsten oxides, tin oxides, amorphous tin oxide composites, silicon monoxide, cobalt oxides, nickel oxides or a combination thereof.

The binder and the conducting agent included in the negative active material layers may be substantially the same as the binder and the conducting agent included in the positive electrode active material layers.

The positive electrode films and the negative electrode films may be formed by applying active materials to metal collectors by various methods. That is, methods of applying electrode active materials are not limited.

The separators 130 may be porous polymer films such as polyethylene films and polypropylene films or may be woven fabric or non-woven fabric including polymer fabric. The separators 130 may include ceramic particles and may include or be formed of solid polymer electrolyte. The separators 130 may be independent films or may be porous layers disposed on the first electrode layers (110, 112) or the second electrode layers (120, 122). In an embodiment, the separators 130 may electrically separate the first electrode layers (110, 112) and the second electrode layers (120, 122) from each other, and may have a shape similar to the shape of the first electrode layers (110, 112) or the second electrode layers (120, 122). In an alternative embodiment, the separators 130 may have shape different from the shape of the first electrode layers (110, 112) or the second electrode layers (120, 122).

The binding structures 210 may include or be formed of a material having low or no reactivity with materials of the layers of the electrode stack structure 100. In one embodiment, for example, the binding structures 210 may include polymer films, laminated films containing a polymer material, a composite material, or a tape. Ends of the binding structures 210 may make fixed contact with a side or another side of the electrode stack structure 100, and an insulative adhesive may only be formed on the ends of the binding structure 210.

In embodiments of the invention, the electrode stack structure 100 may have various types of structure. The electrode stack structure 100 may have a simple stack type structure as shown in FIGS. 1A to 1C or may have any other stack type structure.

Figure 2A:
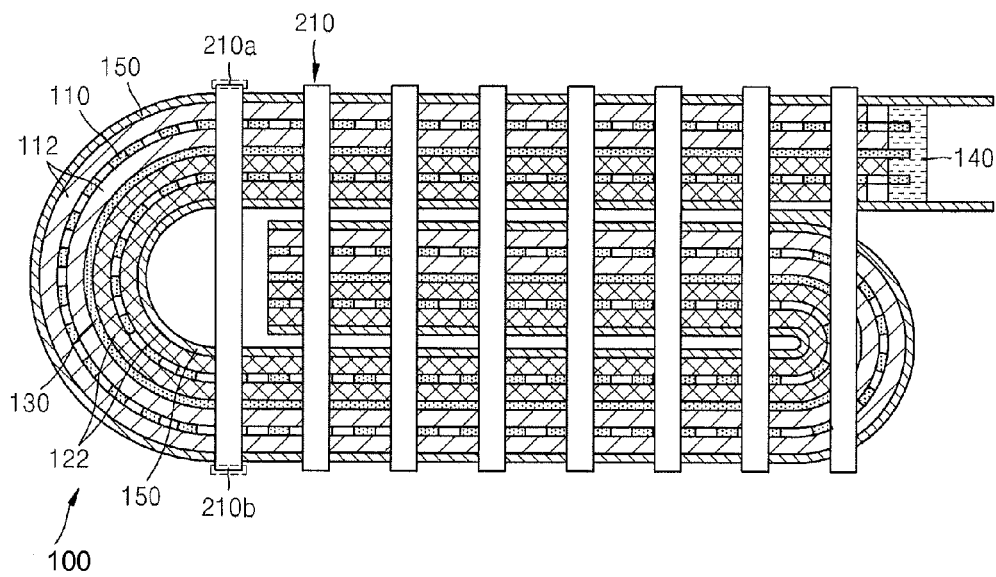
FIGS. 2A and 2B are side views illustrating an electrode stack structure of embodiments of a flexible secondary battery according to the invention.
Figure 2B:
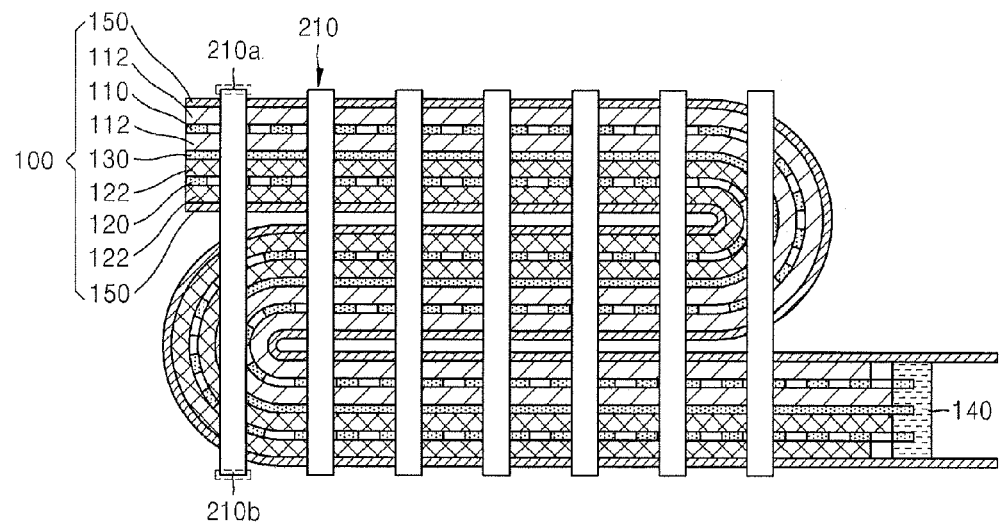

FIGS. 2A and 2B are side views illustrating an electrode stack structure 100 of embodiments of a flexible secondary battery according to the invention. In an embodiment, the electrode stack structure 100 may have a roll type as shown in FIG. 2A, or may have a multi-folding type as shown in FIG. 2B. However, the stacking type of the electrode stack structure 100 is not limited thereto.

In embodiments of the invention, the electrode stack structure 100 of the flexible secondary battery may further include a protection layer 150 disposed on a side thereof, e.g., at least one of opposing sides thereof. The protection layer 150 may include or be formed of a material having flexibility and stiffness so as not to affect bending of the other material layers of the electrode stack structure 100. In one embodiment, for example, the protection layer 150 may have a bending stiffness greater than those of the other layers of the electrode stack structure 100. The protection layer 150 may be a polymer film, a film including a laminated polymer film layer, metal foil, or a composite material film including carbon, for example.

Binding structures 210 and the protection layer 150 may protect the other inner layers of the electrode stack structure 100 from physical impacts or chemical environments. In such an embodiment, when the electrode stack structure 100 is deformed by bending or twisting, a compressive force may be applied in the electrode stack structure 100, and thus the layers of the electrode stack structure 100 may be wrinkled to relieve compressive stress. If the layers of the electrode stack structure 100 are wrinkled, the layers of the electrode stack structure 100 may be separated from each other, and the arrangement of the layers may be irreversibly varied, or the layers may be folded. In an embodiment, the binding structures 210 and the protection layer 150 have predetermined degrees of flexibility and stiffness, and disposed around the electrode stack structure 100, such that the binding structures 210 and the protection layer 150 may effectively prevent large or excessive deformation of the electrode stack structure 100 by suppressing initial slight deformation such as wrinkles having small radii of curvature and may relieve stress of the inner layers of the electrode stack structure 100.

As shown in FIGS. 2A and 2B, in an embodiment, where the electrode stack structure 100 includes the protection layer 150, the binding structures 210 may be disposed around the protection layer 150 of the electrode stack structure 100. Fixed contact portions 210b of the binding structures 210 may be disposed on a side of the protection layer 150, and slidable contact portions 210a of the binding structures 210 may be disposed on another side of the protection layer 150. Such a protection layer may also be disposed or provided on the electrode stack structure 100 of the flexible secondary battery shown in FIGS. 1A to 1C.

Figure 3A:
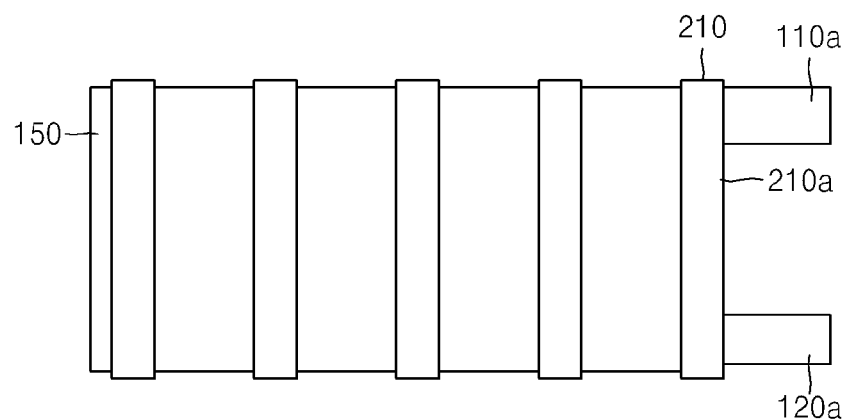
FIG. 3A is a plan view illustrating embodiments of a flexible secondary battery according to the invention.
Figure 3B:
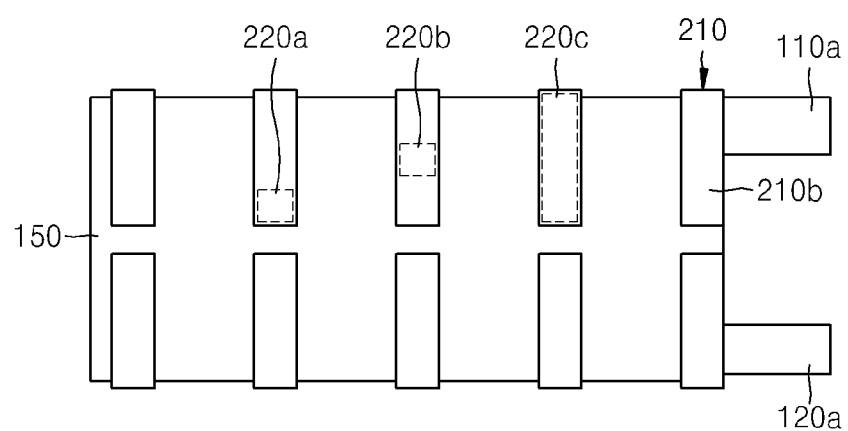
FIG. 3B is a bottom view illustrating an embodiment of the flexible secondary battery according to the invention.

FIG. 3A is a top plan view illustrating an embodiment of a flexible secondary battery according to an embodiment of the invention. FIG. 3B is a bottom plan view illustrating an embodiment of the flexible secondary battery according to the invention.

Referring to FIGS. 3A and 3B, in an embodiment, binding structures 210 may be wound around a protection layer 150 disposed on both opposing sides of an electrode stack structure 100. In an embodiment, as shown in FIG. 3A, slidable contact portions 210a of the binding structures 210 are disposed on a side (e.g., a first side) of the protection layer 150. In such an embodiment, as shown in FIG. 3B, fixed contact portions 210b of the binding structures 210 are disposed on another side (e.g., a second side opposite to the first side) of the protection layer 150. In one embodiment, for example, fixing regions 220a to 220c, at which the fixed contact portions 210b of the binding structures 210 are attached to the protection layer 150, may be defined as shown in FIG. 3B, but not being limited thereto. In such an embodiment, fixing regions 220a to 220c and shapes between the fixed contact portions 210b and the electrode stack structure 100 or the protection layer 150 of the electrode stack structure 100 may be appropriately selected or variously modified. Connection tabs 110a and 120a may protrude from an end of the electrode stack structure 100. The connection tabs 110*a* and 120*a* may extend from first metal collectors 110 and second metal collectors 120, respectively, and may be connected to external lead tabs of the electrode stack structure 100.

FIGS. 4A to 4H are views illustrating binding structures 210 of various embodiments of a flexible secondary battery according to the invention.

Referring to FIGS. 4A to 4H, in an embodiment, the shapes, number and arrangement intervals of the binding structures 210 surrounding an electrode stack structure 100 of the flexible secondary battery are not limited to a specific structure.

The binding structures 210 may include slidable contact portions 210*a* and fixed contact portions 210*b*, and may surround the electrode stack structure 100 with the fixed contact portions 210*b* being in fixed contact with the electrode stack structure 100.

Figure 4A:
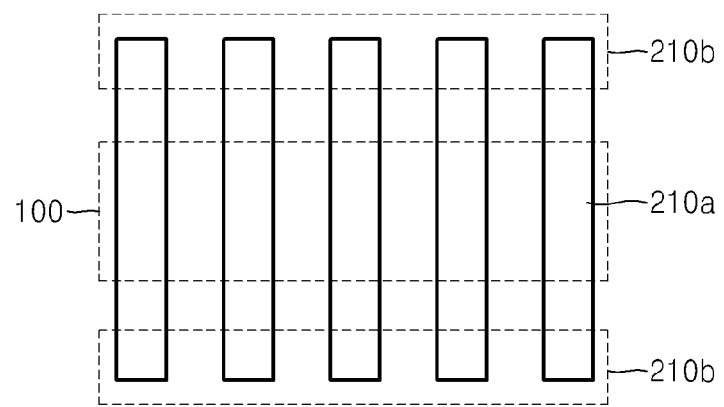
FIGS. 4A to 4H are views illustrating binding structures of various embodiments of a flexible secondary battery according to the invention.

Referring to FIG. 4A, in an embodiment, binding structures 210 may include a plurality of parallel bands or belts, and slidable contact portions 210*a* and fixed contact portions 210*b* have substantially the same width as each other. In such an embodiment, as shown in FIG. 4A, extending directions of the parallel bands or belts of the binding structures 210 may be substantially parallel to the stacking direction of the electrode stack structure 100

Figure 4B:
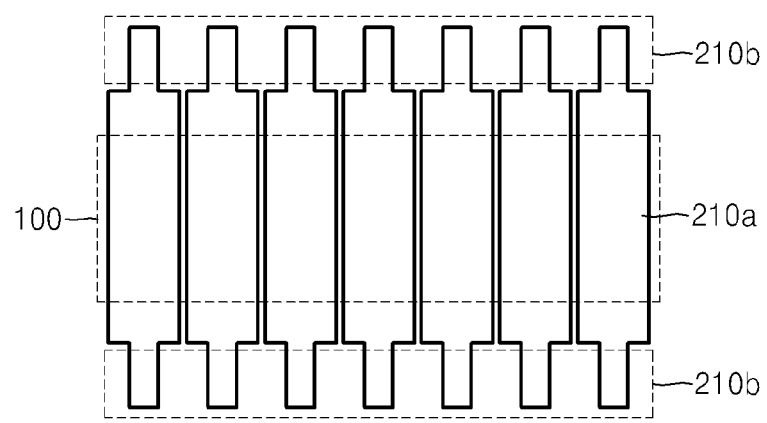

Referring to FIG. 4B, in an alternative embodiment, binding structures 210 may include a plurality of parallel bands or belts, and slidable contact portions 210*a* and fixed contact portions 210*b* have different widths from each other. In such an embodiment, the slidable contact portions 210*a* may be wider than the fixed contact portions 210*b*.

Figure 4C:
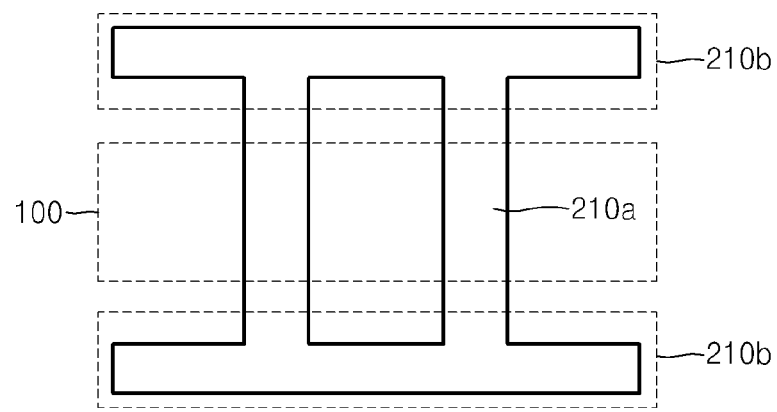

Referring to FIG. 4C, in another alternative embodiment, a binding structure 210 includes relatively wide fixed contact portions 210*b* for the structural stability of the flexible secondary battery.

Figure 4D:
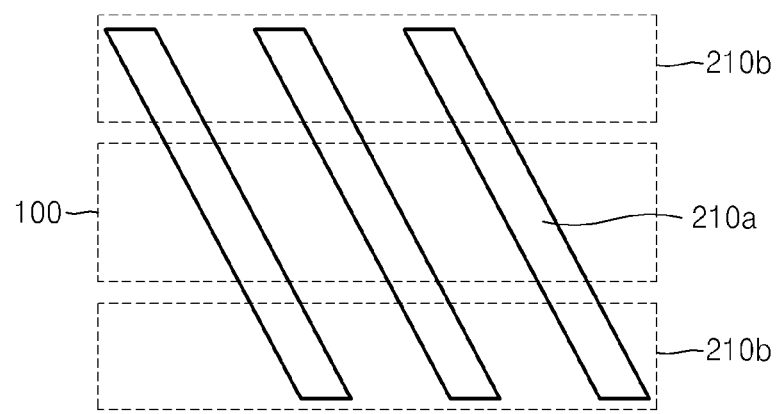

Referring to FIG. 4D, in another alternative embodiment, binding structures 210 may include a plurality of parallel bands or belts, and slidable contact portions 210*a* and fixed contact portions 210*b* have substantially the same width as each other. In such an embodiment, as shown in FIG. 4D, extending directions of the parallel bands or belts of the binding structures 210 may be different from the stacking direction of the electrode stack structure 100.

Figure 4E:
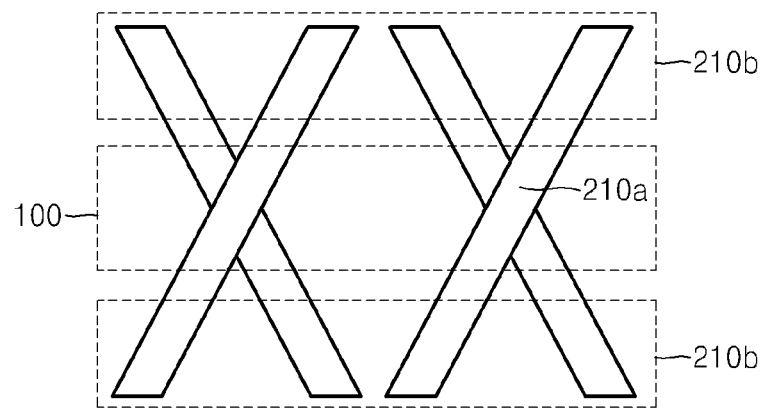

Referring to FIG. 4E, in another alternative embodiment, binding structures 210 are arranged in a crossing manner.

Figure 4F:
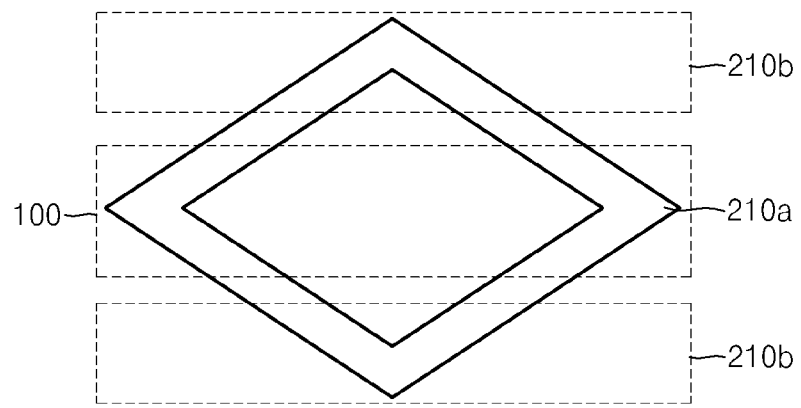
Figure 4G:
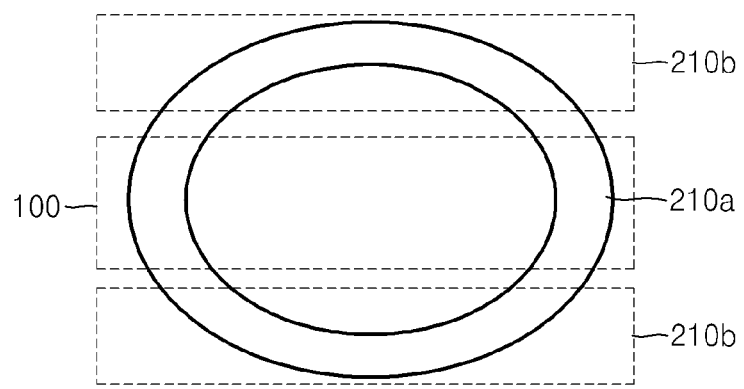

Referring to FIGS. 4F and 4G, in another alternative embodiment, binding structures 210 having a polygonal shape and a circular or elliptical shape are shown.

Figure 4H:
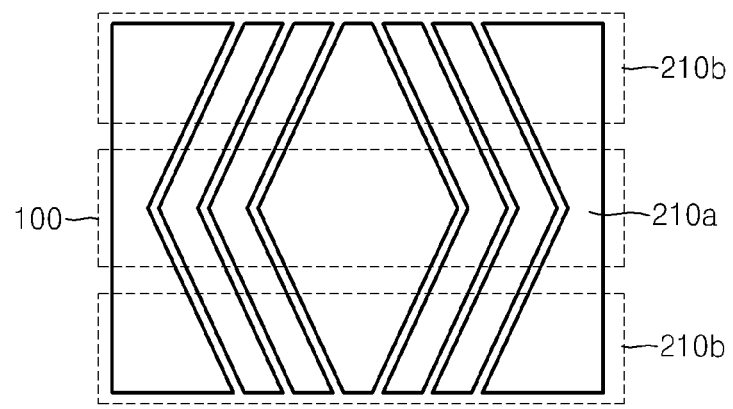

Referring to FIG. 4H, in another alternative embodiment, binding structures 210 having different shapes and sizes are shown.

According to an embodiment of the invention, a flexible secondary battery may further include a stiff film, and binding structures 210 may surround the stiff film. In such an embodiment, the shape of the stiff film may be varied according to the shape of an electrode stack structure.

Figure 5A:
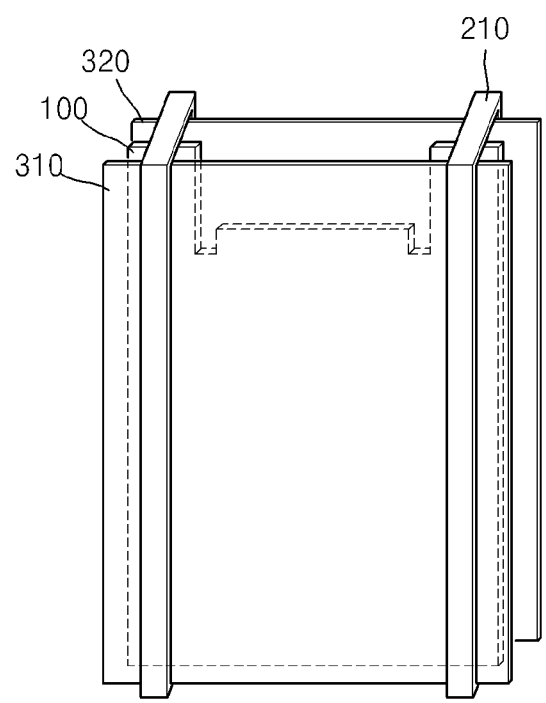
FIGS. 5A to 5C are views illustrating embodiments of a flexible secondary battery, in which stiff films are further included, according to the invention.
Figure 5B:
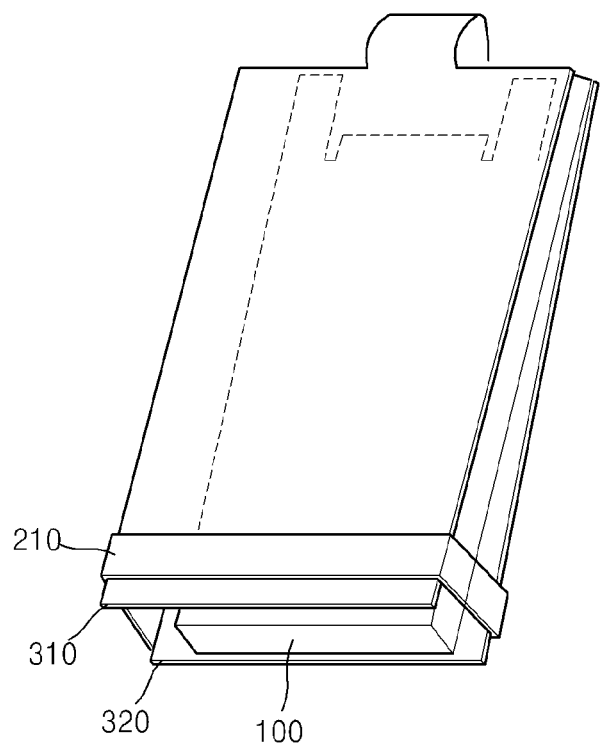
Figure 5C:
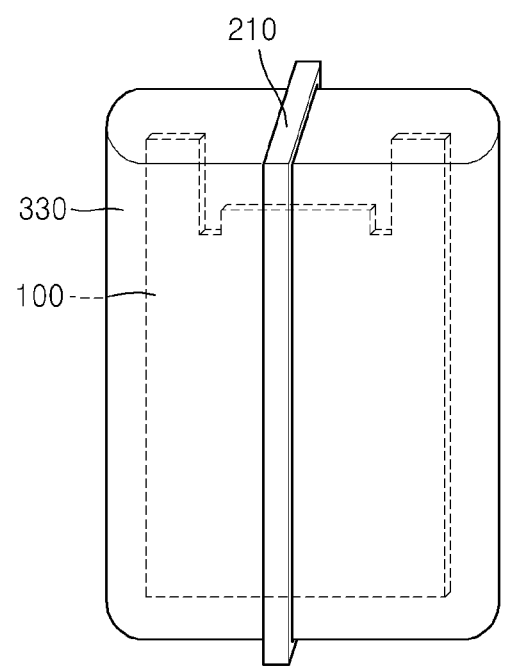

FIGS. 5A to 5C are views illustrating embodiments of a flexible secondary battery, which further includes a stiff film, according to the invention.

Referring to FIG. 5A, in an embodiment, stiff films 310 and 320 are disposed on both opposing sides of an electrode stack structure 100, and binding structures 210 surround the stiff films 310 and 320.

Referring to FIG. 5B, in an alternative embodiment, stiff films 310 and 320 are disposed on both opposing sides of an electrode stack structure 100. In such an embodiment, first ends of the stiff films 310 and 320 may be connected to each other via a connection portion. In such an embodiment, the stiff films 310 and 320 may be integrally formed as a single unitary and indivisible unit. A binding structure 210 may be connected to second ends of the stiff films 310 and 320, which are opposite to the first ends and not connected to each other.

Referring to FIG. 5C, in an embodiment, an electrode stack structure 100 may be disposed in a stiff film 330 having a shape such as a cylindrical shape, and a binding structure 210 may be disposed around the stiff film 330.

In an embodiment, the stiff films 310 and 320 or the stiff film 330 may include a polymer film, a film including a laminated polymer film layer, metal foil, a composite material film including carbon or a combination thereof, for example.

In embodiments of the invention, as shown in FIGS. 5A to 5C, the stiff films are disposed on both opposing sides of the electrode stack structures of the flexible secondary battery, but not being limited thereto. In an embodiment, a stiff film may be disposed on at least one side of an electrode stack structure 100. In an embodiment, a stiff film may be disposed on a side of an electrode stack structure 100, and one or more binding structures 210 may be disposed on another side of the electrode stack structure 100. Alternatively, a stiff film including binding structures may be disposed on both lateral sides of the electrode stack structure 100.

Figure 6A:
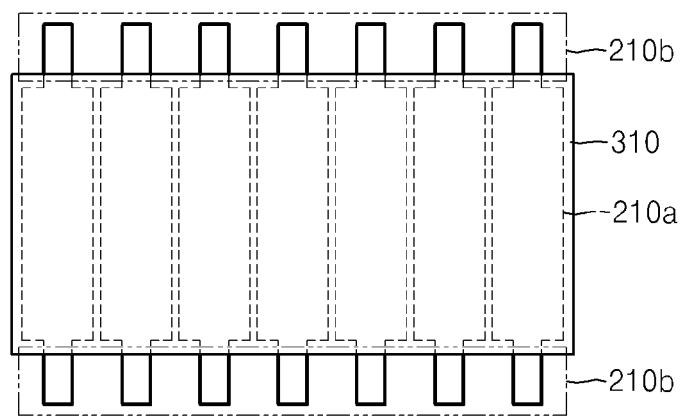
FIG. 6A is a view illustrating an embodiment of a stiff film and binding structures, which is configured to surround an electrode stack structure of a flexible secondary battery, according to the invention.

FIG. 6A is a view illustrating an embodiment of a stiff film 310 and binding structures 210, which is configured to surround an electrode stack structure 100 of a flexible secondary battery, according to the invention.

Referring to FIG. 6A, in an embodiment, the electrode stack structure 100 may be disposed between the stiff film 310 and the binding structures 210. The binding structures 210 may include slidable contact portions 210*a* and fixed contact portions 210*b*. In such an embodiment, where the electrode stack structure 100 is disposed between the stiff film 310 and the binding structures 210, the fixed contact portions 210*b* may make contact with and fixed to the stiff film 310. The slidable contact portions 210*a* may be relatively wide to protect the electrode stack structure 100.

Figure 6B:
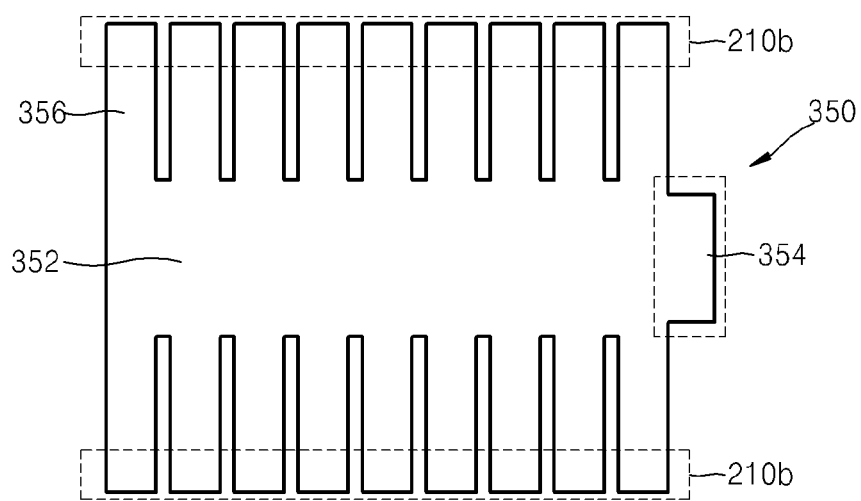
FIG. 6B is a view illustrating an alternative embodiment of a stiff film including binding structures, which is configured to surround an electrode stack structure of a flexible secondary battery, according to the invention.

FIG. 6B is a view illustrating an embodiment of a stiff film 350 including binding structures 356, which is configured to surround an electrode stack structure 100 of a flexible secondary battery, according to the invention.

Referring to FIG. 6B, in an embodiment, the stiff film 350 may include the binding structures 356 extending from a center region 352 to lateral sides in a band or belt shape. Fixed contact portions 210*b* may be defined on ends of the binding structures 356. A fixing portion 354 may be defined on the stiff film 350 to fix an end of an electrode stack structure 100. An embodiment of the stiff film 310 shown FIG. 6A may further include a portion such as the fixing portion 354 shown in FIG. 6B for fixed coupling with the electrode stack structure 100. In such an embodiment, the fixed contact portions 210*b* may be wound around the electrode stack structure 100 placed on the center region 352 of the stiff film 350 to be in contact with and fixed to the electrode stack structure 100.

Figure 7:
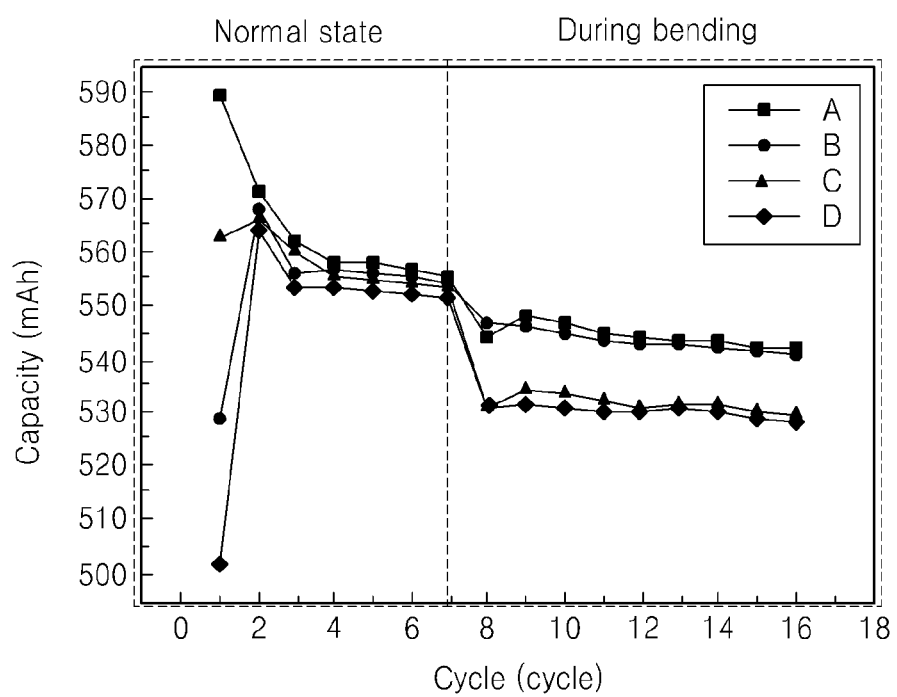
FIG. 7 is a graph illustrating capacity characteristics measured before and after bending embodiments of a flexible secondary battery according to the invention and conventional secondary batteries not including binding structures.

FIG. 7 is a graph illustrating capacity characteristics measured before and after bending embodiments of a flexible secondary battery according to the invention and conventional secondary batteries not including binding structures. In FIG. 7, the horizontal axis denotes cycles during which the flexible secondary batteries are repeatedly bent to a radius of curvature of 40R (herein, R denotes an arc of a circle having a radius of 1 millimeter), and the vertical axis denotes the capacity (milliampere-hour: mAh) of the flexible secondary batteries.

Referring to FIG. 7, in a bending test, capacity variations of embodiments of the flexible secondary battery and conventional flexible secondary batteries were similar in a normal state (non-bent state). However, during bending of electrode stack structures, the capacities of embodiments of the flexible secondary battery A and B including binding structures, according to the invention, were less varied then the conventional secondary batteries C and D not including binding structures.

As described above, according to embodiments of the invention, the binding structures may be in fixed contact with a side of the electrode stack structure of the flexible secondary battery and may be in slidable contact with another side of the electrode stack structure of the flexible secondary battery, and thus the arrangement of the layers of the electrode stack structure may be stably maintained. Therefore, even though the electrode stack structure is bent, such an embodiment of the electrode stack structure may have stable operational characteristics.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more embodiments of the invention have been described with reference to the figures, it will be understood by those of ordinary skill in the art that various changes in form and details may be made therein without departing from the spirit and scope of the invention as defined by the following claims.

What is claimed is:

1. A flexible secondary battery comprising:
    an electrode stack structure comprising:
    a first electrode layer;
    a second electrode layer; and
    a separator disposed between the first and second electrode layers; and
    a binding structure surrounding the electrode stack structure,
    wherein the binding structure is in fixed contact with a first side of the electrode stack structure and is in slidable contact with a second side of the electrode stack structure, which is opposite to the first side of the electrode stack structure.

2. The flexible secondary battery of claim 1, wherein the electrode stack structure further comprises a protection layer disposed on at least one of the first and second sides of the electrode stack structure.

3. The flexible secondary battery of claim 1, further comprising:
    a stiff film disposed on the first side of the electrode stack structure.

4. The flexible secondary battery of claim 3, further comprising:
    another binding structure disposed on the second side of the electrode stack structure.

5. The flexible secondary battery of claim 3, wherein the binding structure is disposed on each of both lateral portions of the stiff film.

6. The flexible secondary battery of claim 3, further comprising:
    another stiff film disposed on the second side of the electrode stack structure,
    wherein the binding structure surrounds the stiff films.

7. The flexible secondary battery of claim 1, wherein the binding structure is disposed in a stacking direction of the electrode stack structure.

8. The flexible secondary battery of claim 1, wherein
    the binding structure is provided in plurality, and
    the plurality of binding structures are arranged in a direction different from a stacking direction of the electrode stack structure.

9. The flexible secondary battery of claim 1, wherein the binding structure has a constant width.

10. The flexible secondary battery of claim 1, wherein the binding structure comprises:
    a fixed contact portion in fixed contact with the first side of the electrode stack structure; and
    a slidable contact portion in slidable contact with the second side of the electrode stack structure.

11. The flexible secondary battery of claim 10, wherein the fixed contact portion and the slidable contact portion have different widths from each other.

12. The flexible secondary battery of claim 1, wherein the electrode stack structure has a single stack type structure, a roll type structure, or a multi-folding type structure.

* * * * *